United States Patent [19]

Orphanos et al.

[11] Patent Number: 4,940,601

[45] Date of Patent: Jul. 10, 1990

[54] SUCROSE FATTY ACID ESTER COMPOSITIONS AND SHORTENINGS AND MARGARINES MADE THEREFROM

[75] Inventors: Peter D. Orphanos, Cincinnati; Christian A. Bernhardt, Fairfield; Bryan L. Madison, Cincinnati; Paul Seiden, Cincinnati; Albert M. Ehrman, Cincinnati; John R. Baginski, Loveland; Timothy B. Guffey, West Chester, all of Ohio

[73] Assignee: The Procter & Gamble Company, Cincinnati, Ohio

[21] Appl. No.: 378,552

[22] Filed: Jul. 11, 1989

Related U.S. Application Data

[63] Continuation of Ser. No. 176,712, Apr. 15, 1988, abandoned, which is a continuation-in-part of Ser. No. 47,367, May 6, 1987, abandoned.

[51] Int. Cl.$^5$ .............................................. A23D 5/00
[52] U.S. Cl. .................................... 426/601; 426/604; 426/606; 426/611; 426/804; 514/558
[58] Field of Search ............... 426/601, 603, 604, 606, 426/611, 804; 514/23, 53, 552, 558; 260/410.6

[56] References Cited

U.S. PATENT DOCUMENTS

| | | |
|---|---|---|
| 3,158,490 | 11/1964 | Baur et al. . |
| 4,005,196 | 1/1977 | Jandacek et al. ..................... 514/23 |
| 4,789,664 | 12/1988 | Seligson et al. . |
| 4,797,300 | 1/1989 | Jandacek et al. . |
| 4,880,657 | 11/1989 | Guffey et al. . |

FOREIGN PATENT DOCUMENTS

| | | |
|---|---|---|
| 0287157 | 10/1988 | European Pat. Off. . |
| 0287158 | 10/1988 | European Pat. Off. . |
| 0290065 | 11/1988 | European Pat. Off. . |
| 0290421 | 11/1988 | European Pat. Off. . |
| 0311154 | 4/1989 | European Pat. Off. . |

OTHER PUBLICATIONS

Mattson et al., "The Effect of a Non-Absorbable Fat . . .", *J. Nutrition* 109, #10, pp. 1688–1693, Oct. (1979).
Mattson et al., "The Effect of a Nonabsorbable . . .", *J. Nutrition* 106, #6, pp. 747–752 (Jun. 1976).
Fallat et al., "Short Term Study of Sucrose Polyester . . .", *Am. J. Clin. Nutr.* 29, pp. 1204–1215, (1976).
Olestra Food Additive Petition, filed 5/7/87, pp. 1,21,23,24 and 56.

*Primary Examiner*—Donald E. Czaja
*Assistant Examiner*—D. Workman
*Attorney, Agent, or Firm*—Gary M. Sutter; Julius P. Filcik; Richard C. Witte

[57] ABSTRACT

The present invention relates to intermediate melting sucrose fatty acid ester compositions that are capable of rapid crystallization from a melted state. The compositions comprise 60% to 97% by weight intermediate melting sucrose fatty acid esters and 3% to 40% hardstock triglycerides or hardstock polyol fatty acid esters. Preferably the average fatty acid chain length of the hardstock material fatty acids is not less than the average fatty acid chain length of the intermediate melting sucrose ester fatty acids. The sucrose fatty acid esters are characterized by their rheology, liquid/solid stability, iodine value, and solids at body temperature. Rapid crystallization of the esters is useful in preventing anal leakage, and it could also translate into a reduction of post-hardening in shortenings and margarines, and into improved high temperature stability and temperature cycling stability as may be encountered during distribution of these products to the end user.

24 Claims, No Drawings

SUCROSE FATTY ACID ESTER COMPOSITIONS AND SHORTENINGS AND MARGARINES MADE THEREFROM

RELATED APPLICATIONS

This is a continuation of application Ser. No. 176,712, filed Apr. 15, 1988, now abandoned, which is a continuation-in-part of application Ser. No. 047,367, filed May 6, 1987, now abandoned.

TECHNICAL FIELD

This invention relates to intermediate melting sucrose fatty acid esters. In particular, the invention describes sucrose fatty acid ester compositions which are capable of rapidly crystallizing from the melted state, and shortenings and margarines made therefrom.

BACKGROUND OF THE INVENTION

Sucrose fatty acid esters are known to be useful as replacements for triglyceride fats. U.S. Pat. No. 3,600,186 to Mattson et al. discloses low calorie, fat-containing, food compositions in which at least a portion of the triglyceride content is replaced with a polyol fatty acid ester such as a sucrose ester, the polyol fatty acid ester having at least four fatty acid ester groups with each fatty acid having from 8 to 22 carbon atoms.

U.S. Pat. No. 4,005,196 to Jandacek et al. discloses the polyol fatty acid esters of the Mattson et al. patent, in combination with fat-soluble vitamins selected from Vitamin A, Vitamin D, Vitamin E and Vitamin K.

U.S. Pat. No. 4,005,195 to Jandacek discloses antianal leakage agents added to the polyol fatty acid esters to prevent an undesirable laxative effect. The agents include solid fatty acids (melting point 37° C. or higher) and their triglyceride source, and solid polyol fatty acid esters.

Bailey, *Melting and Solidification of Fats*, p. 36, Interscience Publishers (1950) discloses that rapid solidification of triglycerides in a melt or solution can often be initiated by "seeding" the liquid with a small proportion of crystals from an extraneous source.

None of these references suggests a way to make particular intermediate melting sucrose fatty acid ester compositions that are capable of rapid crystallization from the melted state.

Therefore, it is an object of the present invention to provide intermediate melting sucrose fatty acid ester compositions that crystallize rapidly from a melt.

It is a related object of the present invention to provide these rapidly crystallizing compositions by the incorporation of particular kinds of hardstock materials.

It is another objects of the present invention to provide shortenings and margarines that contain the sucrose fatty acid ester compositions.

These and other objects of the invention will become evident from the disclosure herein.

All parts, percentages and ratios used herein are by weight unless otherwise defined.

SUMMARY OF THE INVENTION

The invention relates to intermediate melting sucrose fatty acid ester compositions that are capable of rapid crystallization from a melted state. The compositions comprise:

(a) from about 60% to about 97% by weight intermediate melting sucrose fatty acid esters containing at least four fatty acid ester groups, each fatty acid group having from about 8 to about 22 carbon atoms, wherein the sucrose fatty acid esters have: (i) a non-Newtonian plastic rheology at 100° F. (37.8° C.) in particular a yield stress of not less than 150 dynes/cm$^2$ and a viscosity of not less than 15 poise at 100° F. (37.8° C.) after 10 minutes of steady shear at 10 sec.$^{-1}$, (ii) a liquid-solid stability of not less than 90% at 100° F. (37.8° C.), (iii) an iodine value between about 25 and about 55, preferably between about 36 and about 55, and (iv) from about 5% to about 50% solids at body temperature; and (b) from about 3% to about 40% by weight hardstock material selected from the group consisting of hardstock triglycerides and hardstock polyol fatty acid esters, and mixtures thereof, wherein the hardstock has an iodine value not more than about 12.

Preferably the average fatty acid chain length of the hardstock material fatty acids is not less than about the average fatty acid chain length of the intermediate melting sucrose ester fatty acids.

DETAILED DESCRIPTION OF THE INVENTION

It has now been discovered that it is possible to increase the rate at which certain intermediate melting sucrose fatty acid esters crystallize from a melted state. This development is especially useful for sucrose fatty acid ester-containing food products that are eaten warm, where the sucrose esters have been melted. It is believed that rapid crystallization of the melted sucrose esters after ingestion descreases the undesirable possibility of the esters remaining melted as they pass through the gastrointestinal tract and resulting in an anal leakage event.

Because in vivo measurements of crystallization are impractical, it is assumed for the purpose of this invention that in vitro measurements of solids formation at body temperature (98.6° F., 37° C.) is a useful simulation of the in vivo experience. Precedent for an in vitro analytical measurement simulating in vivo experience has been set in the shortening and oils industry with the use of measuring solids content at 92° F. (33° C.) simulating in vivo solids at mouth temperature.

Rapid crystallization of the present sucrose fatty acid esters could also translate into a reduction of post-hardening in shortenings and margarines, and into improved high temperature stability and temperature cycling stability as may be encountered during distribution of these products to the end user.

In a typical shortening and margarine at room temperature, less than about 18% of the fat is in the solid, i.e., crystalline, state. The remainder, about 82% or more, is liquid. In a shortening and margarine it is very important to keep the liquid oil effectively entrapped by the solids so it will not be released upon temperature fluctuations or vibration such as those experienced in distribution of product into commercial trade. Small crystals are most effective in entrapping the liquid oil.

When shortenings and margarines are crystallized in scraped-wall heat exchangers, picker boxes, or other equipment under shear and/or fast agitation, small crystals are formed with few primary and secondary bonds. After suitable tempering, the shortening or margarine remains soft, creamy, and spreadable. This consistency will prevail in commercial trade distribution and in the homes of consumers even after aging and temperature cycling.

If, however, the fat crystallizes too slowly, such as with intermediate melting sucrose fatty acid esters, a large part of the crystallization will take place after the material has left the processing equipment, i.e., the agitated processing conditions. This results in significant growth in the crystal size. This interlocking network of crystals formed in the static state is more rigid, less creamy and cannot as effectively entrap liquid oil. With time the product becomes hard and brittle, resulting in unacceptable consistency and the liquid oil will "weep" or separate from the bulk material, pooling at the surface of the product.

The addition of certain hardstocks to the present intermediate melting sucrose fatty acid esters increases the rate of crystallization, permitting crystallization to be more complete in the processing equipment under agitation. The addition of certain hardstocks also causes other hardstock materials to crystallize which otherwise would not crystallize or would crystallize very slowly. This increased crystallization rate leads to greatly reduced crystal size, significantly improving consistency and stability of the shortening or margarine.

In particular, the present invention is a sucrose fatty acid ester composition comprising:

(a) from about 60% to about 97% by weight intermediate melting sucrose fatty acid esters containing at least four fatty acid ester groups, each fatty acid group having from about 8 to about 22 carbon atoms, wherein the sucrose fatty acid esters have: (i) a non-Newtonian plastic rheology at 100° F. (37.8° C.) in particular a yield stress of not less than 150 dynes/cm$^2$ and a viscosity of not less than 15 poise at 100° F. (37.8° C.) after 10 minutes of steady shear at 10 sec.$^{-1}$, (ii) a liquid/solid stability of not less than 90% at 100° F. (37.8° C.), (iii) an iodine value between about 25 and about 55, preferably between about 36 and about 55, and (iv) from about 5% to about 50% solids at body temperature; and (b) from about 3% to about 40% by weight hardstock material selected from the group consisting of hardstock triglycerides and hardstock polyol fatty acid esters, and mixtures thereof, wherein the hardstock has an iodine value not more than about 12.

As discussed in more detail below, it is preferred that the average fatty acid chain length of the hardstock material fatty acids is not less than about the average fatty acid chain length of the intermediate melting sucrose ester fatty acids.

The Sucrose Fatty Acid Esters

The intermediate melting sucrose fatty acid esters used herein have a specific viscosity and liquid/solid stability, as will be described below. The sucrose esters are also substantially nondigestible and nonabsorbable. Therefore, the sucrose esters must have at least four fatty acid ester groups. Polyol fatty acid ester compounds that contain three or less fatty acid ester groups are digested in and the products of digestion are absorbed from the intestinal tract much in the manner of ordinary triglyceride fats, whereas polyol fatty acid ester compounds that contain four or more fatty acid ester groups are substantially nondigestible and consequently nonabsorbable by the human body. It is not necessary that all of the hydroxyl groups of the sucrose be esterified with fatty acid, but it is preferable that the sucrose contain no more than two unesterified hydroxyl groups. Preferably the sucrose fatty acid esters have: (a) a total content of octa-, hepta-, and hexa-esters of not less than 95%; (b) an octa-ester content of not less than 70%; and (c) a content of the penta- and lower esters of not more than 3%.

The fatty acid groups esterified to the sucrose molecule contain from about 8 to about 22 carbon atoms, and preferably from about 14 to about 18 carbon atoms. Examples of such fatty acids include caprylic, capric, lauric, myristic, myristoleic, palmitic, palmitoleic, stearic, oleic, ricinoleic, linoleic, linolenic, eleostearic, arachidic, arachidonic, behenic, and erucic acid. The fatty acids can be derived from naturally occurring or synthetic fatty acids; they can be saturated or unsaturated, including positional and geometrical isomers. The fatty acids esterified to the sucrose molecule are of mixed chain length to obtain the rheology and stability properties required herein.

The sucrose fatty acid esters suitable for use herein can be prepared by a variety of methods known to those skilled in the art. These methods include: transesterification of the sucrose with methyl, ethyl or glycerol fatty acid esters using a variety of catalysts; acylation of the sucrose with fatty acid chlorides; acylation of the sucrose with fatty acid anhydrides; and acylation of the sucrose with fatty acids, per se. Mixtures of different fatty acids are used in the synthesis. The preparation of sucrose fatty acid esters is described in general in U.S. Pat. Nos. 2,831,854, 3,963,699 and 4,517,360 (all herein incorporated by reference).

A specific, but non-limiting, example of the preparation of intermediate melting sucrose fatty acid esters suitable for use herein is the esterification of sucrose with methyl esters of a fully hydrogenated soy oil (I.V. 8) and a partially hydrogenated soy oil (I.V. 107) blended in a 45:55 ratio.

Non-limiting examples of the present sucrose fatty acid esters are esters made by esterifying sucrose with a blend of partially and nearly completely hardened soybean oil methyl esters, for example, esters having the following properties: (1) octaester content 84.5%; SFC at 50° F. (10° C.) of 71.8, at 70° F. (21° C.) of 64.2, at 80° F. (27° C.) of 51.1, at 92° F. (33° C.) of 33.2, and at 105° F. (41° C.) of 9.5; fatty acid composition of 11.5% $C_{16}$, 54.2% $C_{18}$, 17.9% $C_{18:1}$, 14.2% $C_{18:2}$, 1% $C_{18:3}$, 0.5% $C_{20}$, and 0.3% $C_{22}$; and I.V. of 42.6; or (2) octaester content of 92.1%; SFC at 50° F. (10° C.) of 61.2, at 70° F. (21° C.) of 48.4, at 80° F. (27° C.) of 36.2, at 92° F. (33° C.) of 19.2, and at 105° F. (41° C.) of 3.1; fatty acid composition of 9.8% $C_{16}$, 50.6% $C_{18}$, 21.6% $C_{18:1}$, 15.7% $C_{18:2}$, 1% $C_{18:3}$, 0.5% $C_{20}$ and 0.3% $C_{22}$; and I.V. of 48.6.

The intermediate melting sucrose fatty acid esters of the present invention have a non-Newtonian plastic rheology at 100° F. (37.8° C.), in particular a yield stress of not less than 150 dynes/cm$^2$ and a viscosity of not less than 15 poise at 100° F. (37.8° C.) after 10 minutes of steady shear at 10 sec.$^{-1}$. The sucrose esters also have a liquid/solid stability of not less than 90% at 100° F. (37.8° C.). In general terms, the esters can be described as being very viscous and plastic. The liquid portion of the esters does not readily separate from the solid portion.

The sucrose fatty acid esters can be a single type of ester or a mixture of esters. It is not critical that each type of ester has the above-mentioned physical properties as long as the intermediate melting sucrose esters as a whole have these physical properties.

It was discovered that sucrose fatty acid esters having the above-mentioned rheology and liquid/solid stability are effective at avoiding anal leakage while containing surprisingly low levels of solids at body temperature. The low solids levels allow the production of non-waxy, excellent-tasting foods. For further details on esters having these rheology characteristics, see European Patent Application No. 236,288 of Bernhardt, published Sept. 9, 1987 (incorporated by reference herein).

If the hardstock material of the present invention comprises sucrose fatty acid esters, it is preferred that the combination of intermediate melting sucrose fatty acid esters and hardstock has the above-mentioned rheology and liquid/solid stability.

Viscosity and yield stress are known rheological properties, and can be measured by use of an instrument such as a plate and cone viscometer (e.g., a Ferranti-Shirley viscometer, manufactured by Ferranti Electric, Inc., 87 Modular Ave., Commack, NY 11725). The basics of rheology are discussed in Idson, "Rheology: Fundamental Concepts", Cosmetics and Toiletries, Vol. 93, pp. 23–30 (July 1978). Viscosity is calculated from a point on the rheogram curve. Additional details are provided below under the Analytical Methods section.

The Hardstock Materials

The sucrose fatty acid ester compositions of the present invention contain from about 3% to about 40% by weight of a hardstock material in addition to the sucrose esters. The hardstock is selected from hardstock triglycerides and hardstock polyol fatty acid esters, and mixtures thereof, and it has an iodine value of not more than about 12. The hardstock contains between about 80% and about 100% solids at body temperature.

As discussed more fully below, it has been found that in order to achieve the most rapid crystallization of the intermediate melting sucrose fatty acid ester compositions from the melted state, the average fatty acid chain length of the hardstock material fatty acids must be not less than about the average fatty acid chain length of the intermediate melting sucrose ester fatty acids. However, crystallization more rapid than that of the sucrose esters alone can be achieved using hardstock materials with a shorter average fatty acid chain length as well.

The hardstock is a substantially completely hydrogenated triglyceride fat or polyol fatty acid ester having an iodine value not exceeding about 12. The hardstock can be obtained by hydrogenating naturally occurring triglyceride oils such as palm oil, cottonseed oil, soybean oil, sunflower oil, corn oil, peanut oil, and the like, or mixtures thereof.

Hardened polyol fatty acid polyesters having an iodine value not more than about 12 are also useful as the hardstock. The polyol fatty acid polyesters are those described generally above. However, the hardstock polyesters generally contain fatty acids that are more saturated than unsaturated, and more longer than shorter fatty acid chains. Typical examples of hardstock polyol polyesters include completely esterified sucrose polyester made from the esters of hardened palm or soybean oils, sucrose heptastearate, xylitol pentastearate, galactose pentapalmitate, and the like, or mixtures thereof.

The present invention is illustrated by the crystallization behavior of the following compositions:

| | Intermediate Melting Sucrose Ester A | Intermediate Melting Sucrose Ester B | Intermediate Melting Sucrose Ester C |
| --- | --- | --- | --- |
| $C_{12}$ | — | — | — |
| $C_{14}$ | — | — | — |
| $C_{16}$ | 11.1 | 9.9 | 12.1 |
| $C_{17}$ | — | 0.2 | 0.2 |
| $C_{18}$ | 50.6 | 50.0 | 51.8 |
| $C_{18:1}$ | 21.1 | 21.9 | 18.6 |
| $C_{18:2}$ | 15.8 | 16.3 | 15.8 |
| $C_{18:3}$ | 1.0 | 1.1 | 0.8 |
| $C_{20}$ | 0.4 | 0.4 | 0.5 |
| $C_{22}$ | — | 0.3 | 0.2 |
| Other | — | — | — |
| IV | 48.1 | 49.7 | 45.4 |
| Avg. fatty acid chain length | 17.8 | 17.8 | 17.8 |
| Yield stress (dynes/cm$^2$) | 1078 | 843 | 1400 |
| Viscosity (poise) | 31 | 37.2 | 60–150 |
| Liquid/solid stability | >95% | 96.4% | 92–100% |
| Octa ester | 83% | 89.4% | 76–78% |
| Octa, hepta, hexa | 98.6% | 99–100% | 99–100% |
| Penta & lower | <0.1% | <0.1% | <0.2% |
| Solids at body temp. | 8.8 | 6.3 | 18.3 |

| | Palm Triglyceride Hardstock A | Soybean Triglyceride Hardstock B | Rapeseed Triglyceride Hardstock C |
| --- | --- | --- | --- |
| $C_{12}$ | 0.2 | — | — |
| $C_{14}$ | 1.1 | — | — |
| $C_{16}$ | 43.2 | 10.3 | 3.9 |
| $C_{17}$ | — | 0.2 | — |
| $C_{18}$ | 54.5 | 87.8 | 35.1 |
| $C_{18:1}$ | — | 0.4 | 0.3 |
| $C_{18:2}$ | — | 0.1 | 0.1 |
| $C_{18:3}$ | — | — | — |
| $C_{20}$ | 0.6 | 0.6 | 10.0 |
| $C_{22}$ | — | 0.4 | 49.1 |
| Other | 0.5 | 0.3 | 1.5 |
| IV | 0.1 | 0.5 | 0.5 |
| Avg. fatty acid chain length | 17.1 | 17.8 | 20.1 |

| | Soybean Sucrose Ester Hardstock D | Soybean Sucrose Ester Hardstock E | Palm Sucrose Ester Hardstock F |
| --- | --- | --- | --- |
| $C_8$ | — | — | 0.9 |
| $C_{12}$ | — | — | — |
| $C_{14}$ | — | — | 1.0 |
| $C_{16}$ | 10.0 | 10.3 | 50.1 |
| $C_{17}$ | — | — | — |
| $C_{18}$ | 87.2 | 88.1 | 47.9 |
| $C_{18:1}$ | 1.6 | 0.9 | — |
| $C_{18:2}$ | 0.3 | — | — |
| $C_{18:3}$ | — | — | — |
| $C_{20}$ | 0.6 | 0.6 | — |
| $C_{22}$ | 0.3 | — | — |
| Other | — | — | — |
| IV | 1.9 | 0.8 | 0.0 |
| Avg. fatty acid chain length | 17.8 | 17.8 | 16.9 |

Average fatty acid chain length is calculated from the fatty acid composition determined by GCFAC.

$$x = \frac{(GCFAC^* \times chain\ length)}{GCFAC^*}$$

*not including "other".

Example: Intermediate Melting Sucrose Ester A = [(0.111 × 16) + (0.506 × 18) + (0.211 × 18) + (0.158 × 18) + (0.01 × 18) + (0.004 × 20)]/(0.111 + 0.506 + 0.211 + 0.158 + 0.01 + 0.004)

$\bar{x} = 17.8$

Samples are made containing the intermediate melting sucrose fatty acid esters by themselves, and in combination with the different hardstocks, using a hardstock level of 14% by weight of the total sample. Hardstocks A, B and C are triglyceride hardstocks, hardstocks D and E are sucrose fatty acid ester hardstocks made by esterifying sucrose with hardened soybean oil fatty acids, and hardstock F is a sucrose fatty acid ester hardstock made by esterifying sucrose with hardened palm oil fatty acids. The compositions are completely melted by heating at 158° F. (70° C.) for 30 minutes, and then held at 98.6° F. (37° C.) to observe the crystallization behavior. The table of results below illustrates the crystallization behavior of the samples made with intermediate melting sucrose ester A.

|  | Rate of Solids Formation at 98.6° F. (37° C.) | | | | | | |
|---|---|---|---|---|---|---|---|
|  | SFC at 98.6° F. (37° C.) | 198 s. | 252 s. | 306 s. | 360 s. | 414 s. | 450 s. |
| Intermediate melting sucrose ester A | 8.8 | 1.0 | 0.6 | 1.1 | 1.0 | 1.2 | 1.0 |
| Sucrose ester A/hardstock A | 26.3 | 0.8 | 0.4 | 1.2 | 0.5 | 1.2 | 1.9 |
| Sucorse ester A/hardstock B | 34.5 | 2.4 | 2.5 | 2.7 | 3.4 | 7.1 | 8.4 |
| Sucrose ester A/hardstock C | 30.8 | 0.7 | 7.4 | 11.8 | 13.7 | 15.3 | 16.2 |
| Sucrose ester A/hardstock D | 31.7 | 0.0 | 0.1 | 7.3 | 11.6 | 13.6 | 14.9 |
| Sucrose ester A/hardstock E | 30.1 | 0.0 | 1.8 | 7.8 | 12.2 | 14.4 | 15.6 |
| Sucrose ester A/hardstock F | 27.8 | 1.8 | 1.4 | 1.5 | 1.9 | 3.1 | 4.5 |

Surprisingly, it has been found that the addition of hardstocks to an intermediate melting sucrose fatty acid ester results in a higher level of solids at body temperature (SABT) than expected. For example, when the SABT of sucrose ester A is measured by SFC, it is found to be 8.8%. Assuming that the level of SABT in the hardstock is 100%, it is calculated that adding 14% hardstock to the sucrose ester would result in SABT of:

$$(0.86 \times 8.8) + (0.14 \times 100) = 21.6\% \text{ SABT}$$

Actual measurement by SFC results in an increased level of solids ranging from about 26% to about 35% SABT depending on the type of hardstock as shown in the table above. Given their higher SABT, it would be expected that the rate of crystallization of these hardstock/sucrose ester mixtures would be greater than the rate of crystallization of the sucrose ester alone. This is the case as seen in the table.

It would be expected that the sucrose ester/hardstock mixture having the highest SABT would also have the highest rate of crystallization at 98.6° F. (37° C.). Surprisingly, this is not the case. For example, the hardstock producing the highest rate of crystallization for the sucrose ester mixture shown above had 30.8% SABT. It appears that the hardstocks having the highest rates of crystallization at body temperature are those wherein the average fatty acid chain length is not less than the average fatty acid chain length of the intermediate melting sucrose ester fatty acids.

The following tables illustrate the crystallization behavior of the samples made with intermediate melting sucrose esters B and C and the different hardstocks:

|  | Rate of Solids Formation at 98.6° F. (37° C.) | | | | | | |
|---|---|---|---|---|---|---|---|
|  | SFC at 98.6° F. (37° C.) | 198 s. | 252 s. | 306 s. | 360 s. | 414 s. | 450 s. |
| Intermediate melting sucrose ester B | 6.3 | 1.3 | 1.4 | 1.2 | 1.1 | 1.1 | 1.6 |
| Sucrose ester B/hardstock B | 27.7 | 0.1 | 0.9 | 1.3 | 1.4 | 3.6 | 4.7 |
| Sucrose ester B/hardstock C | 31.1 | 0.0 | 1.5 | 6.5 | 9.2 | 10.8 | 12.1 |
| Sucrose ester B/hardstock D | 28.7 | 0.0 | 0.0 | 5.1 | 8.9 | 12.0 | 13.2 |
| Sucrose ester B/hardstock E | 29.1 | 0.0 | 0.0 | 3.0 | 7.7 | 10.9 | 12.1 |
| Sucrose ester B/hardstock F | 30.4 | 1.7 | 1.5 | 1.4 | 2.0 | 3.3 | 4.9 |

|  | Rate of Solids Formation at 98.6° F. (37° C.) | | | | | | |
|---|---|---|---|---|---|---|---|
|  | SFC at 98.6° F. (37° C.) | 198 s. | 252 s. | 306 s. | 360 s. | 414 s. | 450 s. |
| Intermediate melting sucrose ester C | 18.3 | 0.0 | 0.2 | 0.2 | 0.4 | 0.7 | 0.7 |
| Sucrose ester C/hardstock A | 34.8 | 0.0 | 0.0 | 0.0 | 1.6 | 4.6 | 6.6 |
| Sucrose ester C/hardstock B | 40.6 | 0.5 | 1.2 | 4.6 | 9.0 | 12.0 | 13.0 |
| Sucrose ester C/hardstock C | 35.8 | 2.9 | 8.1 | 12.8 | 15.6 | 17.6 | 18.8 |
| Sucrose ester C/hardstock D | 35.4 | 0.0 | 1.7 | 8.6 | 12.6 | 15.2 | 16.6 |
| Sucrose ester C/hardstock E | 35.7 | 0.0 | 1.3 | 7.0 | 11.6 | 14.3 | 16.2 |
| Sucrose ester C/hardstock F | 37.0 | 0.0 | 0.0 | 0.0 | 2.2 | 6.0 | 8.2 |

The results demonstrate that the most rapid crystallization of the intermediate melting sucrose esters from a melt is achieved by adding a hardstock having an average fatty acid chain length not less than about that of the sucrose ester fatty acids. Hardstocks B, C, D and E have an average fatty acid chain length not less than that of the intermediate melting sucrose ester fatty acids. The significant increase in percent solids over time for these compositions indicates that the compositions undergo rapid crystallization at 98.6° F. (37° C.) from the melted state. By contrast, hardstocks A and F have an average fatty acid chain length shorter than that of the sucrose ester fatty acids, and the compositions undergo slower crystallization over time. In fact it is suspected that the intermediate melting sucrose ester fatty acids have an inhibiting effect on the crystallization of these hardstocks having an average fatty acid chain length shorter than that of the sucrose ester fatty acids.

Integrated Rheogram Area

While the above data indicates that each of the added hardstocks form more solids at body temperature than expected, it has been discovered that there are significant differences in the types of solid systems formed. This can be measured as the integrated rheogram area of the sucrose fatty ester/hardstock mixtures at 100° F. (37.8° C.), at 100 seconds$^{-1}$ using a Ferranti-Shirley viscometer. Additional details are provided below under the Analytical Methods section. Measurements for mixtures of intermediate melting sucrose fatty acid ester A, B and C and 14% of hardstocks A, B, C, D, E, and F are given below:

|  |  | Integrated Rheogram Area (mm$^2$) |
| --- | --- | --- |
| Sucrose ester A |  | 0 |
| Sucrose ester A/hardstock | A | 1225 |
|  | B | 2305 |
|  | C | 7604 |
|  | D | 7982 |
|  | E | 8272 |
|  | F | 4394 |
| Sucrose ester B |  | 0 |
| Sucrose ester B/hardstock | A | 612 |
|  | B | 2343 |
|  | C | 6353 |
|  | D | 7057 |
|  | E | 5914 |
|  | F | 3898 |
| Sucrose ester C |  | 1079 |
| Sucrose ester C/hardstock | A | 2238 |
|  | B | 4522 |
|  | C | 8746 |
|  | D | 10220 |
|  | E | 9136 |
|  | F | 5174 |

These differences are important in the formulation of products. Those sucrose fatty ester/hardstock mixtures which are more fluid (smaller rheogram area) are expected to be useful in formulating products such as fluid, or pourable, shortenings but not useful in products such as solid shortenings or other products not intended to be pourable. Those sucrose fatty ester/hardstock mixtures which are more viscous (larger rheogram area) are expected to be useful in formulating products such as solid shortenings or margarines. Those mixtures which are particularly useful in formulating semi-solid or solid products such as solid shortenings and margarines are believed to be those mixtures of intermediate melting sucrose fatty acid esters and hardstocks wherein the:

(i) average fatty acid chain length of the hardstock material fatty acids is greater than the average fatty acid chain length of the intermediate melting sucrose ester fatty acids, or (ii) the average fatty acid chain length of the hardstock material fatty acids is not less than about the average fatty acid chain length of the intermediate melting sucrose ester fatty acids and the hardstock material comprises sucrose fatty acid esters.

Crystallization of Other Hardstocks

As discussed above, the most rapid crystallization of the present intermediate melting sucrose fatty acid esters is caused by the addition of hardstocks having an average fatty acid chain length not less than about that of the sucrose ester fatty acids. In the following discussion, these will be termed the "longer chain length hardstocks".

Another embodiment of the present invention relates to the effect of the addition of these longer chain length hardstocks on other hardstock materials present in the sucrose ester compositions. Surprisingly, it has been discovered that not only do the present sucrose ester compositions rapidly crystallize, but that these longer chain length hardstocks cause other hardstock materials to crystallize in the compositions as well.

These compositions comprise from about 60% to about 98% intermediate melting sucrose fatty acid esters as described above, from about 1% to about 39% hardstock materials as described above having an average fatty acid chain length not less than about that of the intermediate melting sucrose ester fatty acids (the "longer chain length hardstocks"), and from about 1% to about 39% of a second hardstock material selected from the group consisting of hardstock triglycerides and hardstock polyol fatty acid esters, and mixtures thereof, wherein the second hardstock has an iodine value not more than about 12 and from about 80% to about 100% solids at body temperature, and wherein the average fatty acid chain length of the second hardstock material fatty acids is less than about the average fatty acid chain length of the intermediate melting sucrose ester fatty acids. These latter hardstocks will be termed the "shorter chain length hardstocks" in the following discussion.

From about 10% to about 80% other materials such as soft oils, intermediate melting fat, water, milk solids, color, flavor, emulsifiers, etc., may be used to dilute the above composition in formulating various finished foods as will be demonstrated hereinafter.

Differential Scanning Calorimetry (DSC) can be used to measure the amounts of energy given off by the formation of or the amounts of energy required to melt solids. The basics of DSC theory are discussed in Applewhite, *Bailey's Industrial Oil and Fat Products*, 4th Ed., Vol. 3, pp. 204–206 (1985), John Wiley & Sons, New York. Upon cooling a completely melted sample from 70° C. (158° F.) to −60.0° C. (−76° F.) using a DSC, it is possible to calculate the amount of energy given off as solids form. It is useful to the present invention to look at the level of solids formed above 80° F. (27° C.). This temperature is slightly below the temperature representing onset of solids formation for the formulations given below. Solids formed above this temperature will largely be hardstock materials.

| | Cooling from 70° C. (158° F.) | |
| --- | --- | --- |
| Formula | Calories/gm 80° F. (27° C.) Total | Onset Temperature |
| 58% liquid soybean oil (i.v. 107), 35% intermediate melting sucrose ester, 7% hardstock triglyceride (I.V. <1) | 0.049 | 81.4° F. (27.5° C.) |
| 65% liquid soybean oil (I.V. 107), 33% intermediate melting sucrose ester, 2% hardstock sucrose fatty acid ester (I.V. <1) | 0.530 | 88.7° F. (31.5° C.) |
| 58% liquid soybean oil (I.V. 107), | 1.446 | 91.0° F. (31.5° C.) |

-continued

| Formula | Cooling from 70° C. (158° F.) | |
|---|---|---|
| | Calories/gm 80° F. (27° C.) Total | Onset Temperature |
| 33% intermediate melting sucrose ester, 7% hardstock triglyceride (I.V. <1), 2% hardstock sucrose ester (I.V. <1) | | |

Upon cooling the formulae shown above it is seen that the presence of 7% triglyceride hardstock with shorter average fatty acid chain length than the intermediate melting sucrose ester ("shorter chain length hardstock") results in 0.049 calories being given off. In the formula which contains no shorter chain length hardstock, but does contain 2% of a hardstock with longer fatty acid chain length ("longer chain length hardstock"), 0.530 calories are given off. It would be expected that the presence of both hardstocks in the third formulation would result in giving off about the additive energy of when the two hardstocks are used by themselves (0.049+0.530=0.579). Instead, surprisingly, more than twice the additive energy (0.579×2=1.158) is given off (1.446).

This phenomenon is also seen when the level of the longer chain length hardstock is varied. This has been demonstrated using DSC. The expected level of calories to be given off due to addition of the longer chain length hardstock can be determined by adding the hardstock to a liquid triglyceride (less than 1% solids above 70° F. [21° C.]). These samples are raised to 70° C. (158° F.) and then are cooled to −60.0° C. (−76° F.) in a DSC instrument and the energies given off above 80° F. (27° C.) are measured. The expected level of energy given off above 80° F. (27° C.) for shortening formulations containing shorter chain length hardstock and varying levels of longer chain length hardstock can be calculated. This is done by adding the expected level of calories obtained above for the longer chain length hardstock and adding it to the actual calories for a shortening containing shorter chain length hardstock and not containing longer hardstock. See below.

| | Cooling | | | | |
|---|---|---|---|---|---|
| | % Longer Chain Length Hardstocks | | | | |
| | 0.0 | 1.5 | 2.5 | 3.5 | 5.0 |
| Expected calories/gm above 80° F. (27° C.) from added longer chain length hardstock | 0.00 | 0.29 | 0.54 | 0.79 | 1.16 |
| Expected calories/gm above 80° F. (27° C.) of shortening with indicated levels of longer chain length hardstock | — | 0.79 | 1.04 | 1.29 | 1.66 |
| Actual calories/gm above 80° F. (27° C.) of shortening with indicated levels of longer chain length hardstock | 0.50 | 1.57 | 2.02 | 2.31 | 2.60 |

The level of energy given off above 80° F. (27° C.) is surprisingly higher than expected.

Upon completely melting formulations to 70° C. (158° F.) and cooling back to −60.0° C. (−76° F.), then raising the temperature back to about 60° C. (140° F.), it is possible to measure the amount of energy required to melt solids as a function of temperature. It is useful in the present invention to look at the amount of energy required above 105° F. (41° C.). Energy required above this point will largely be the result of the presence of hardstock materials.

Upon heating the formula containing only the shorter chain length hardstock, 0.026 calories are required above 105° F. (41° C.). The formula containing only the longer chain length hardstock requires 0.367 calories above 105° F. (41° C.). It would be expected that the presence of both hardstocks in the third formulation would result in requiring the additive energies of when the two hardstocks are used themselves (0.026+0.367=0.393). Instead, surprisingly, more than twice the additive energy (0.393×2=0.786) is given off (0.823).

| Formula | Cooling from 70° C. (158° F.) | |
|---|---|---|
| | Calories/gm >80° F. (27° C.) Total | Comp. MP |
| 58% liquid soybean oil (I.V. 107), 35% intermediate melting sucrose ester, 7% hardstock triglyceride (I.V. <1) | 0.026 | 107.6° F. (42° C.) |
| 65% liquid soybean oil (I.V. 107), 33% intermediate melting sucrose ester, 2% hardstock sucrose fatty acid ester (I.V. <1) | 0.367 | 112.6° F. (45° C.) |
| 58% liquid soybean oil (I.V. 107), 33% intermediate melting sucrose ester, 7% hardstock triglyceride (I.V. <1), 2% hardstock sucrose ester (I.V. <1) | 0.823 | 115.8° F. (46.5° C.) |

As with cooling, the same phenomenon in heating can be seen as the level of the longer chain length hardstock is varied. The expected level of calories required above 105° F. (41° C.) for the longer chain length hardstock can be determined by adding varying levels of the hardstock to a liquid triglyceride oil (same as used in cooling) and using DSC to measure the amount of energy required above 105° F. (41° C.). The expected level of calories above 105° F. (41° C.) of a shortening with added longer chain length hardstock can be determined by measuring the actual level of energy required above 105° F. (41° C.) of a shortening without the longer chain length hardstock and adding to it the expected energy for the longer chain length hardstock. See below.

| | Heating | | | | |
|---|---|---|---|---|---|
| | % Longer Chain Length Hardstock | | | | |
| | 0.0 | 1.5 | 2.5 | 3.5 | 5.0 |
| Expected calories/gm above 105° F. (41° C.) from added longer chain length hardstock | 0.0 | 0.19 | 0.35 | 0.52 | 0.77 |
| Expected calories/gm above 105° F. (41° C.) of shortening with indicated levels of longer chain length hardstock | — | 0.39 | 0.55 | 0.72 | 0.97 |

| | -continued | | | | |
|---|---|---|---|---|---|
| | Heating | | | | |
| | % Longer Chain Length Hardstock | | | | |
| | 0.0 | 1.5 | 2.5 | 3.5 | 5.0 |
| Actual calories/gm above 105° F. (41° C.) of shortening with indicated levels of longer chain length hardstock | | | | | |
| plasticized | 0.20 | 1.08 | 1.53 | 1.89 | 2.25 |
| recycle heating | 0.20 | 0.42 | 0.94 | 1.26 | 1.74 |

Again, the level of energy required above 105° F. (41° C.) is surprisingly higher than expected. This is the case both for a plasticized shortening heated in the DSC from about 21° C. (70° F.) to about 60° C. (140° F.), as well as for the plasticized shortening which has been subjected to recycle heating by being completely melted (70° C., 158° F.), cooled to about −60° C. (−76° F.), and heated to about 60° C. (140° F.).

Shortening Compositions

Another embodiment of the present invention is shortenings that contain the sucrose fatty acid ester compositions described hereinabove. The shortenings comprise:

(a) from about 10% to about 80% by weight of a sucrose fatty acid ester composition comprising:
  (i) from about 60% to about 97% by weight intermediate melting sucrose fatty acid esters containing at least four fatty acid ester groups, each fatty acid group having from about 8 to about 22 carbon atoms, wherein the intermediate melting sucrose fatty acid esters have an iodine value between about 25 and about 55, preferably between about 36 and 55, from about 5% to about 50% solids at body temperature, a non-Newtonian plastic rheology at 100° F. (37.8° C.) and in particular a yield stress of not less than 150 dynes/cm$^2$ and a viscosity of not less than 15 poise at 100° F. (37.8° C.) after 10 minutes of steady shear at 10 sec.$^{-1}$, and a liquid/solid stability of not less than 90% at 100° F. (37.8° C.); and
  (ii) from about 3% to about 40% by weight first hardstock material selected from the group consisting of hardstock triglycerides and hardstock polyol fatty acid esters, and mixtures thereof, wherein the hardstock has an iodine value not more than about 12 and from about 80% to about 100% solids at body temperature, and wherein the average fatty acid chain length of the hardstock material fatty acids is not less than about the average fatty acid chain length of the intermediate melting sucrose ester fatty acids;
(b) from about 20% to about 90% by weight soft oil;
(c) from about 0% to about 50% by weight intermediate melting triglyceride;
(d) from about 0% to about 20% by weight second hardstock material selected from the group consisting of hardstock triglycerides and hardstock polyol fatty acid esters, and mixtures thereof, wherein the second hardstock has an iodine value not more than about 12 and from about 80% to about 100% solids at body temperature, and wherein the average fatty acid chain length of the second hardstock material fatty acids is less than the average fatty acid chain length of the intermediate melting sucrose ester fatty acids; and
(e) from about 0% to about 15% other shortening ingredients.

The soft oil of the present shortenings is a liquid oil which acts to provide fluidity to the shortenings so that they are creamy and can be easily scooped. Suitable soft oils have an iodine value (IV) between about 70 and about 130. If an intermediate melting fat is used in the present shortening, it is preferred that the soft oil have an IV between about 80 and about 130, to adjust for the solids introduced by the intermediate melting fat. The soft oil can be derived from animal, vegetable or marine sources, including naturally occurring oils such as cottonseed oil, rapeseel oil, canola oil, low erucic acid rapeseed oil, soybean oil, sunflower oil, corn oil, peanut oil, safflower oil, and the like, or mixtures thereof.

Soft oils can be partially hydrogenated to prevent flavor deterioration caused by their more highly unsaturated components such as linolenic acid residues. The partial hydrogenation of oils can be achieved by any of a number of art recognized techniques, all of which involve contacting the oil with gaseous hydrogen in the presence of a catalyst such as nickel and/or copper. See, e.g., Bailey's Industrial Oil and Fat Products, supra, pp. 793 et seq. This partially hydrogenated soybean oil is winterized to remove solids to provide a soft oil having an IV of from about 110 to about 115. See, e.g., Bailey's Industrial Oil and Fat Products, supra, pp. 1007 et seq. for winterization techniques. It is also desirable that the soft oil, e.g., partially hydrogenated soybean oil, be refined, bleached and deodorized in accordance with conventional practice. See, e.g., Bailey's Industrial Oil and Fat Products, supra, pp. 719 et seq. and 897 et seq.

Both the longer chain length hardstock and the shorter chain length hardstock provide plasticity to the present shortenings in combination with the other fat materials, and also provide high temperature heat stability. Additionally, the hardstocks affect the crystal structure of the shortenings. The addition of more hardstock tends to flatten out the solid fat content profile of the shortenings. The hardstocks are derived from sources described hereinabove. For use in the present shortenings, preferred second hardstock materials are those that are triglycerides containing palmitic-stearic-palmitic or palmitic-stearic-stearic fatty acids in the 1, 2 and 3 positions. Certain vegetable oils or fractions thereof contain these predominantly beta-prime triglycerides, for example, hardened palm oil and hardened cottonseed oil.

The intermediate melting triglyceride used in the present shortenings contributes to the crystal structure and increases the shortenings' oxidative stability. Further, the intermediate melting triglyceride can be beneficial in increasing the plastic range of the shortenings. Suitable intermediate melting triglycerides have an IV between about 25 and about 60 and contain between about 0% and about 60% solids at body temperature. Triglyceride oils which can be hydrogenated to yield an intermediate melting fat are soybean oil, palm oil, cottonseed oil, peanut oil, coconut oil, and the like, or mixtures thereof. Rearranged fats or oils prepared by interesterification can also be used herein. Preferred intermediate melting triglycerides are hydrogenated to an IV of about 35–55.

The present shortenings also comprises from about 0% to about 15% by weight of other shortening ingredients. Various additives can be used herein provided that they are edible and aesthetically desirable and do not have any detrimental effects on the shortenings. The shortenings can normally contain minor amounts of optional flavorings, emulsifiers, anti-spattering agents, anti-sticking agents, anti-oxidants, or the like. These shortenings are preferably supplemented with Vitamin E at a level of 1.0 mg d-alpha-tocopherol equivalents per gram of non-caloric fat-like material. As with standard shortenings, nitrogen can also be added to the shortenings during processing to improve the lightness of color of the product. The present shortenings can be processed with one or more of the following processes: hydrogenation, winterization, dewaxing, interesterification, etc. Any standard processing method can be used to plasticize the present shortenings.

The following data illustrate the more rapid crystallization of shortenings made according to the present invention.

A shortening composition as described above is made with varying levels of hardstock made by esterifying sucrose with the fatty acid esters of hardened soybean oil. This hardstock material has an iodine value of less than 1. The hardstock fatty acids have an average chain length about the same as that of the intermediate melting sucrose ester fatty acids. The hardstock is added at levels of 0.00%, 0.50%, 1.00%, 5.00%, 10.00%, and 15.00% by weight of the shortening. The shortening samples are melted by heating to 158° F. (70° C.) over a time of 30 minutes, and then allowed to crystallize at a temperature of 80° F. (27° C.). The percent solids is recorded versus time of crystallization.

| | Solid Formation at 80° F. (27° C.) | | | |
|---|---|---|---|---|
| | Seconds | | | |
| % Hardstock | 90 | 108 | 126 | 144 |
| 0.00 | 1.45 | 2.26 | 1.46 | 1.94 |
| 0.50 | 2.01 | 2.11 | 1.60 | 1.75 |
| 1.00 | 1.52 | 1.66 | 1.73 | 1.94 |
| 5.00 | 2.02 | 1.82 | 1.97 | 2.06 |
| 10.00 | 2.27 | 2.44 | 3.60 | 6.77 |
| 15.00 | 2.14 | 3.09 | 4.90 | 8.68 |
| | 180 | 216 | 270 | 360 | 450 |
| 0.96 | 1.26 | 1.05 | 1.26 | 3.06 |
| 1.18 | 1.04 | 1.19 | 3.28 | 4.57 |
| 0.71 | 1.15 | 1.92 | 3.45 | 5.38 |
| 3.76 | 7.38 | 9.04 | 9.08 | 9.72 |
| 10.52 | 12.32 | 13.65 | 13.94 | 14.74 |
| 13.74 | 16.30 | 17.71 | 17.64 | 18.21 |

The results demonstrate that the addition of hardstock to the shortening increases its rate of crystallization from a melt, and that higher levels of hardstock result in faster crystallization.

Margarine-Type Compositions

Initial experience with hardstock addition for increased rates of crystallization of intermediate melting sucrose fatty acid esters was with shortenings. Although it was desirable to investigate margarines containing intermediate melting sucrose fatty acid esters, the thought of using hardstocks for improved stability was resisted for two reasons: (i) it was unclear whether or not the benefits would be seen in a product containing water; (ii) hardstocks are not normally desirable for margarines as they tend to impart a waxy mouthfeel.

Surprisingly, however, it has been determined that hardstocks can be included in margarine compositions containing intermediate melting sucrose fatty acid esters with resultant improved stability and acceptable in-mouth texture.

Another embodiment of the present invention is a margarine-type composition comprising:

(a) from about 10% to about 60% by weight of a sucrose fatty acid ester composition comprising: (i) from about 60% to about 97% by weight intermediate melting sucrose fatty acid esters containing at least four fatty acid ester groups, each fatty acid group having from about 8 to about 22 carbon atoms, wherein the sucrose fatty acid esters have an iodine value between about 25 and about 55, preferably between about 36 and about 55, and from about 5% to about 50% solids at body temperature, and wherein the sucrose fatty acid esters have: a non-Newtonian plastic rheology at 100° F. (37.8° C.), in particular a yield stress of not less than 150 dynes/cm$^2$ and a viscosity of not less than 15 poise at 100° F. (37.8° C.) after 10 minutes of steady shear at 10 sec.$^{-1}$, and a liquid/solid stability of not less than 90% of 100° F. (37.8° C.); and (ii) from about 3% to about 40% by weight hardstock material selected from the group consisting of hardstock triglycerides and hardstock polyol fatty acid esters, and mixtures thereof, wherein the hardstock has an iodine value not more than about 12 and from about 80% to about 100% solids at body temperature, and wherein the average fatty acid chain length of the hardstock material fatty acids is not less than about the average fatty acid chain length of the intermediate melting sucrose ester fatty acids;

(b) from about 20% to about 70% by weight soft oil;

(c) from about 0% to about 10% by weight intermediate melting triglyceride;

(d) from about 0% to about 15% other margarine ingredients; and (e) from about 0.1% to about 20% water.

The soft oil and intermediate melting triglyceride are the same as those described above for the shortening compositions. The other margarine ingredients include flavors, colors, emulsifiers, preservatives, milk solids, salt, and mixtures thereof. These margarines are preferably supplemented with Vitamin E at a level of 1.0 mg d-alpha-tocopherol equivalents per gram of non-caloric fat-like material.

Analytical Methods

1. Solid Fat Content

The method for determining Solid Fat Content (SFC) values of a fat by PMR is described in Madison and Hill, *J. Amer. Oil. Chem. Soc.*, Vol. 55 (1978), pp. 328-31 (herein incorporated by reference). Before determining SFC values, the shortening sample is heated to a temperature of 140° F. (60° C.) for at least 0.5 hours or until the sample is completely melted. The melted sample is then tempered at a temperature of 32° F. (0° C.) for 15 minutes, 80° F. (27° C.) for 30 minutes, and 32° F. (0° C.) for 15 minutes. After tempering, the SFC value of the shortening at temperatures of 50° F. (10° C.), 70° F. (21° C.), 80° F. (27° C.), 92° F. (33° C.) and 105° F. (41° C.) is determined by pulsed magnetic resonance (PMR) after equilibrating for 30 minutes at each temperature.

2. Rheology Measurements:

a. Sample Preparation

The sucrose fatty acid ester sample or sucrose fatty acid ester/hardstock sample is heated until it completely melts (about 195° F., 91° C.) and is thoroughly mixed. Ten grams of the melted sample is weighed into a pre-heated 20 ml glass vial. The sample is then allowed to recrystallize at 100° F.±5° F. (37.8° C.±3° C.) for 24 hours. After the 24 hour time period has elapsed, the sample is taken to the viscometer and the viscosity and yield stress are measured.

b. Ferranti-Shirley Viscometer Operation Procedure

A Ferranti-Shirley viscometer equipped with a 600 gm torque spring is used for the viscosity and yield stress measurements of the sucrose fatty acid ester sample or sucrose fatty acid ester/hardstock sample. A cone is put into place, and the viscometer temperature is adjusted to 100° F. (37.8° C.). The chart recorder is calibrated, and the gap between the cone and plate is set. The cone speed is checked, and the cone and plate temperatures are equilibrated to 100° F. (37.8° C.). The panel controls are set. Sufficient sample is placed between the plate and the cone so that the gap is completely filled. The temperature is allowed to stabilize at 100° F. (37.8° C.) for about 30 seconds, and then the cone rotation and recording are started. A rheogram for the sample is recorded and analyzed to determine the viscosity and yield stress. Viscosity is measured at 10 seconds$^{-1}$ after 10 minutes of steady shear. Yield stress is measured at zero time and is the stress required to achieve deformational flow.

c. Integrated Area Under Rheogram

A twenty-gram sample is melted and mixed as described above, and then about one gram of the melted sample is placed into the Ferranti-Shirley viscometer which has equilibrated at 100° F. (37.8° C.). The sample's shear stress is measured at 100 sec$^{-1}$ for a period of 5 minutes. Recording paper is used such that scale for chart speed is 25 millimeters per minute and the scale for shear stress is 145 dynes/cm$^2$ equals one millimeter. After the rheogram is generated, the area under the curve is integrated using hand calculations or any of several computer assisted programs for such. The integrated area is then reported in millimeters squared.

3. Liquid/Solid Stability Measurement:

The sucrose fatty acid ester sample or sucrose fatty acid ester/hardstock sample is heated until it completely melts and is thoroughly mixed. The sample is then poured into Beckman #344062 4.4 ml. centrifuge tubes to capacity. The tubes are immediately transferred to a 100° F.±5° F. (37.8° C.±3° C.) constant temperature room and allowed to recrystallize undisturbed for 24 hours. The samples are then centrifuged at 60,000 rpm in a Beckman Model L8 70M centrifuge having a Beckman Model SW 60 head (Beckman Instruments, Palo Alto, California) for one hour at 100° F. (37.8° C.) (the centrifuge and centrifuge head is previously equilibrated at 100° F. [37.8° C.]). The maximum force on the samples is 85,000 G's (i.e., the force at the bottom of the centrifuge tubes). The liquid/solid stability is then calculated as follows:

Liquid/Solid Stability =

$$\frac{100 \times (\text{total volume of sample} - \text{volume of liquid})}{\text{total volume of sample}}$$

4. Fatty Acid Composition

Principle

The fatty acid composition of the sucrose esters and hardstocks of the present invention is measured by gas chromatography. First, fatty acid methyl esters of the sucrose esters or hardstocks are prepared by any standard method (e.g., by transesterification using sodium methoxide), and then separated on a capillary column which is coated with DB-WAX stationary phase. The fatty acid methyl esters are separated by chain length and degree of unsaturation. A split injection is made with flame ionization detection. Quantitation is performed by an area normalization method. This method can separate fatty acid methyl esters from C6 to C24.

| Equipment | |
|---|---|
| Gas Chromatograph | Hewlett-Packard 5890, or equivalent, equipped with a split injector and flame ionization detector, Hewlett-Packard Co., Scientific Instruments Div., 1601-T California Ave., Palo Alto, CA 94304 |
| Autosampler | Hewlett-Packard 7673A, or equivalent |
| Injector column | 15 m × 0.25 mm I.D., fused silica capillary column coated with DB-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, BD40, Kipp & Zonen |

Internal Standards

A reference standard of a known triglyceride is used when determining the fatty acid composition of the sucrose fatty acid esters or hardstocks herein. The triglyceride reference standard has the following fatty acid composition: 0.4% $C_{16}$, 21.4% $C_{16}$, 9.2% $C_{18}$, 40.3% $C_{18:1}$, 23.0% $C_{18:2}$, 0.4% $C_{20}$, 1.3% $C_{20:1}$, 2.2% $C_{18:3}$, and 0.3% $C_{22}$.

A. Instrumental Set-up

1. Install the column in the gas chromatograph, and set up the instrumental conditions as in Table 1.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.

TABLE 1

| INSTRUMENTAL CONDITIONS | |
|---|---|
| Instrument | Hewlett-Packard 5890 |
| Column | 15 m × 0.25 mm I.D., coated with DB-WAX, 0.25 u film thickness |
| Column head pressure | 12.5 psi |
| Carrier gas | Helium |
| Injector "A" temperature | 210° C. (410° F.) |
| Split vent flow | 100 mL/min |
| Septum purge | 1.5 mL/min |
| Oven temperature profile: | |
| Initial temperature | 110° C. (230° F.) |
| Initial time | 1 min |
| Rate 1 | 15° C./min |
| Final temp 1 | 170° C. (338° F.) |
| Final time 1 | 0 min |
| Rate 2 | 6° C./min |
| Final temp 2 | 200° C. (392° F.) |
| Final time 2 | 0 min |
| Rate 3 | 10° C./min |
| Final temp 3 | 220° C. (428° F.) |
| Final time 3 | 8 min |
| Detector | FID |
| Detector temp | 230° C. (446° F.) |

TABLE 1-continued

| INSTRUMENTAL CONDITIONS | |
|---|---|
| Make-up gas | 42 mL/min |
| Detector H$_2$ flow | 30 mL/min |
| Detector air flow | 300 mL/min |

B. Analysis of Samples - (The samples are analyzed with an area normalization procedure.)

1. Prepare fatty acid methyl esters of the reference standard and sucrose ester or hardstock sample according to any standard method.
2. Set up a sequence in the LAS data system to inject the samples and reference standard.
3. Activate the autosampler to inject 1.0 uL of the samples and standard in the sequence. The gas chromatograph will automatically begin its temperature program and the data system will collect and analyze the data for the sequence.

EXAMPLE 1

A preferred sucrose fatty acid ester composition according to the invention is prepared by combining 86% by weight intermediate melting sucrose fatty acid esters with the following properties: 98.6% octa-, hepta-, and hexa esters and less than 0.1% penta- and lower esters; fatty acid compositions of 11.1% $C_{16}$, 50.6% $C_{18}$, 21.1% $C_{18:1}$, 15.8% $C_{18:2}$, 1.0% $C_{18:3}$, 0.4% $C_{20}$; average fatty acid chain length of 17.8; yield stress of 1078 dynes/cm$^2$; viscosity of 31 poise; liquid/solid stability of 95%; iodine value of 48.1; 8.8% solids at body temperature with 14% of a triglyceride hardstock material with the following properties=fatty acid composition of 3.9% $C_{16}$, 35.1% $C_{18}$, 0.3% $C_{18:1}$, 0.1% $C_{18:2}$, 10.0% $C_{20}$, 49.1% $C_{22}$, 1.5% other; average fatty acid chain length of 20.1; iodine value of 0.5.

EXAMPLE 2

A composition according to the invention is prepared as in Example 1 except that the hardstock is a sucrose ester hardstock material with the following properties: fatty acid composition of 10.0% $C_{16}$, 87.2% $C_{18}$, 1.6% $C_{18:1}$, 0.3% $C_{18:2}$, 0.6% $C_{20}$, 0.3% $C_{22}$; average fatty acid chain length of 17.6; iodine value of 1.9.

EXAMPLE 3

Shortenings according to the invention are prepared in a conventional manner by combining the following ingredients:

| Ingredient | Shortening A | Shortening B | Shortening C | Shortening D | Shortening E |
|---|---|---|---|---|---|
| Soybean oil, I. V. 107 | 58.5 | 58.5 | 58.5 | 53.5 | 58.5 |
| Intermediate melting triglyceride, I. V. 43 | — | — | — | 3.5 | 0 |
| Palm triglyceride hardstock, I. V. 4 | 4.0 | 4.0 | 4.0 | 3.5 | 4.0 |
| Intermediate melting sucrose fatty acid esters | 33.0 | 28.0 | 18.0 | 27.4 | 23.0 |
| Hardstock sucrose fatty acid esters | 0.0 | 5.0 | 15.0 | 7.6 | 10.0 |
| Emulsifier | 4.5 | 4.5 | 4.5 | 4.5 | 4.5 |

EXAMPLE 4

Margarines according to the invention are prepared in a conventional manner by combining the following ingredients:

| Ingredient | Margarine A | Margarine B |
|---|---|---|
| Intermediate melting sucrose fatty acid ester | 30.0 | 30.12 |
| Hardstock sucrose fatty acid ester, I.V. 8 | 5.0 | 5.02 |
| Intermediate melting triglyceride | 1.0 | — |
| Soybean oil, I.V. 107 | 39.0 | 40.16 |
| Emulsifier | 0.5 | 1.0 |
| Color | 0.015 | 0.004 |
| Flavor | 0.2005 | 0.7 |
| Salt | 2.75 | 1.51 |
| Nonfat dry milk solids | 2.0 | 1.0 |
| Preservative | 0.13 | 0.13 |
| Water | 19.4012 | 20.34 |
| Vitamin A palmitate | 0.0033 | — |

What is claimed is:

1. A sucrose fatty acid ester composition comprising:
   (a) from about 60% to about 97% by weight intermediate melting sucrose fatty acid esters containing at least four fatty acid ester groups, each fatty acid group having from about 8 to about 22 carbon atoms, wherein the sucrose fatty acid esters have: (i) a viscosity of not less than 15 poise at 100° F. (37.8° C.) after 10 minutes of steady shear at 10 sec.$^{-1}$, (ii) a liquid/solid stability of not less than 90% at 100° F. (37.8° C.); (iii) an iodine value between about 25 and about 55, and (iv) from about 5% to about 50% solids at body temperature; and
   (b) from about 3% to about 40% by weight hardstock material selected from the group consisting of hardstock triglycerides and hardstock polyol fatty acid esters, and mixtures thereof, wherein the hardstock has an iodine value not more than about 12.

2. A composition according to claim 1 wherein the iodine value of the intermediate melting sucrose fatty acid esters is between about 36 and about 55.

3. A composition according to claim 1 wherein the average fatty acid chain length of the hardstock material fatty acids is not less than about the average fatty acid chain length of the intermediate melting sucrose ester fatty acids.

4. A composition according to claim 3 wherein the average fatty acid chain length of the hardstock material fatty acids is at least about one carbon unit longer than the average fatty acid chain length of the intermediate melting sucrose ester fatty acids.

5. A composition according to claim 3 wherein the hardstock material comprises sucrose fatty acid esters.

6. A composition according to claim 5 wherein the combination of intermediate melting sucrose fatty acid esters and hardstock has a yield stress of not less than 150 dynes/cm², a viscosity of not less than 15 poise at 100° F. (37.8° C.) after 10 minutes of steady shear at 10 seconds$^{-1}$ and a liquid/solid stability of not less than 90% at 100° F. (37.8° C.).

7. A composition according to claim 5 wherein the average fatty acid chain length of the hardstock material fatty acids is at least about one carbon unit longer than the average fatty acid chain length of the intermediate melting sucrose ester fatty acids.

8. A composition according to claim 7 wherein the combination of intermediate melting sucrose fatty acid esters and hardstock has a yield stress of not less than 150 dynes/cm², a viscosity of not less than 15 poise at 100° F. (37.8° C.) after 10 minutes of steady shear at 10 seconds$^{-1}$ and a liquid/solid stability of not less than 90% at 100° F. (37.8° C.).

9. A composition according to claim 1 comprising from about 5% to about 25% by weight hardstock material.

10. A composition according to claim 1 comprising from about 10% to about 25% by weight hardstock material.

11. A composition according to claim 1 wherein the hardstock is selected from the group consisting of hardstock triglycerides and hardstock sucrose fatty acid esters, and mixtures thereof.

12. A composition according to claim 11 wherein the average fatty acid chain length of the hardstock material fatty acids is at least about one carbon unit longer than the average fatty acid chain length of the intermediate melting sucrose ester fatty acids.

13. A composition according to claim 1 wherein the hardstock is a triglyceride.

14. A composition according to claim 13 wherein the average fatty acid chain length of the hardstock material fatty acids is at least about one carbon unit longer than the average fatty acid chain length of the intermediate melting sucrose ester fatty acids.

15. A composition according to claim 3 comprising from about 60% to about 98% by weight intermediate melting sucrose fatty acid esters, from about 1% to about 39% by weight of the first hardstock material of claim 3 and additionally comprising from about 1% to about 39% by weight of a second hardstock material selected from the group consisting of hardstock triglycerides and hardstock polyol fatty acid esters, and mixtures thereof, wherein the second hardstock has an iodine value not more than about 12, and wherein the average fatty acid chain length of the second hardstock material fatty acids is less than about the average fatty acid chain length of the intermediate melting sucrose ester fatty acids.

16. A shortening composition comprising:
(a) from about 10% to about 80% by weight of a sucrose fatty acid ester composition comprising:
 (i) from about 60% to about 97% by weight intermediate melting sucrose fatty acid esters containing at least four fatty acid ester groups, each fatty acid group has from about 8 to about 22 carbon atoms, wherein the intermediate melting sucrose fatty acid esters have an iodine value between about 25 and about 55, from about 5% to about 50% solids at body temperature, a viscosity of not less than 15 poise at 100° F. (37.8° C.) after 10 minutes of steady shear at 10 sec.$^{-1}$, and a liquid/solid stability of not less than 90% at 100° F. (37.8° C.);
 (ii) from about 3% to about 40% by weight first hardstock material selected from the group consisting of hardstock triglycerides and hardstock polyol fatty acid esters, and mixtures thereof, wherein the hardstock has an iodine value not more than about 12, and wherein the average fatty acid chain length of the hardstock material fatty acids is not less than about the average fatty acid chain length of the intermediate melting sucrose ester fatty acids;
(b) from about 20% to about 90% by weight soft oil;
(c) from about 0% to about 50% by weight intermediate melting triglyceride;
(d) from about 0% to about 20% by weight second hardstock material selected from the group consisting of hardstock triglycerides and hardstock polyol fatty acid esters, and mixtures thereof, wherein the second hardstock material has an iodine value not more than about 12, and wherein the average fatty acid chain length of the second hardstock material fatty acids is less than the average fatty acid chain length of the intermediate melting sucrose ester fatty acids; and
(e) from about 0% to about 15% other shortening ingredients.

17. A shortening according to claim 16 wherein the average fatty acid chain length of the first hardstock material fatty acids is greater than the average fatty acid chain length of the intermediate melting sucrose ester fatty acids.

18. A shortening according to claim 16 wherein the average fatty acid chain length of the first hardstock material fatty acids is not less than about the average fatty acid chain length of the intermediate melting sucrose ester fatty acids and the first hardstock material comprises sucrose fatty acid esters.

19. A margarine composition comprising:
(a) from about 10% to about 60% by weight of a sucrose fatty acid ester composition comprising:
 (i) from about 60% to about 97% by weight intermediate melting sucrose fatty acid esters containing at least four fatty acid ester groups, each fatty acid group having from about 8 to about 22 carbon atoms, wherein the sucrose fatty acid esters have an iodine value between about 25 and about 55, from about 5% to about 50% solids at body temperature, and wherein the sucrose fatty acid esters have: a viscosity of not less than 15 poise at 100° F. (37.8° C.) after 10 minutes of steady shear at 10 sec.$^{-1}$, and a liquid/solid stability of not less than 90% at 100° F. (37.8° C.);
 (ii) from about 3% to about 40% by weight hardstock material selected from the group consisting of hardstock triglycerides and hardstock polyol fatty acid esters, and mixtures thereof, wherein the hardstock has an iodine value not more than about 12, and wherein the average fatty acid chain length of the hardstock material fatty acids is not less than about the average fatty acid chain length of the intermediate melting sucrose ester fatty acids;
(b) from about 20% to about 70% by weight soft oil;
(c) from about 0% to about 10% by weight intermediate melting triglyceride;
(d) from about 0% to about 15% other margarine ingredients; and
(e) from about 0.1% to about 20% water.

20. A margarine according to claim 19 wherein the average fatty acid chain length of the hardstock material fatty acids is greater than the average fatty acid chain length of the intermediate melting sucrose ester fatty acids.

21. A margarine according to claim 19 wherein the average fatty acid chain length of the hardstock material fatty acids is not less than about the average fatty acid chain length of the intermediate melting sucrose ester fatty acids and the hardstock material comprises sucrose fatty acid esters.

22. A composition according to claim 1 wherein the intermediate melting sucrose fatty acid esters have a yield stress of not less than 150 dynes/cm$^2$ at 100° F. (37.8° C.).

23. A shortening according to claim 16 wherein the intermediate melting sucrose fatty acid esters have a yield stress of not less than 150 dynes/cm$^2$ at 100° F. (37.8° C.).

24. A margarine according to claim 19 wherein the intermediate melting sucrose fatty acid esters have a yield stress of not less than 150 dynes/cm$^2$ at 100° F. (37.8° C.).

* * * * *

UNITED STATES PATENT AND TRADEMARK OFFICE
CERTIFICATE OF CORRECTION

PATENT NO.  : 4,940,601

DATED       : July 10, 1990

INVENTOR(S) : Peter D. Orphanos et al.

It is certified that error appears in the above-identified patent and that said Letters Patent is hereby corrected as shown below:

Column 17, line 54, delete "85,000" and insert therefor --485,000--

Signed and Sealed this

Twenty-first Day of April, 1992

Attest:

HARRY F. MANBECK, JR.

*Attesting Officer*     *Commissioner of Patents and Trademarks*